United States Patent
Lin et al.

(10) Patent No.: US 11,094,088 B2
(45) Date of Patent: Aug. 17, 2021

(54) METHOD AND APPARATUS OF IN-LOOP FILTERING FOR VIRTUAL BOUNDARIES IN VIDEO CODING

(71) Applicant: MEDIATEK INC., Hsinchu (TW)

(72) Inventors: Sheng Yen Lin, Hsinchu (TW); Lin Liu, Beijing (CN); Jian-Liang Lin, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 42 days.

(21) Appl. No.: 16/557,643

(22) Filed: Aug. 30, 2019

(65) Prior Publication Data

US 2020/0074687 A1    Mar. 5, 2020

Related U.S. Application Data

(60) Provisional application No. 62/792,489, filed on Jan. 15, 2019, provisional application No. 62/791,963, (Continued)

(30) Foreign Application Priority Data

Aug. 30, 2019 (WO) ............. PCT/CN2019/103706

(51) Int. Cl.
*G06K 9/00* (2006.01)
*G06T 9/00* (2006.01)
(Continued)

(52) U.S. Cl.
CPC ............ *G06T 9/00* (2013.01); *G06T 3/40* (2013.01); *G06T 19/006* (2013.01); (Continued)

(58) Field of Classification Search
CPC .... G06T 9/00; G06T 9/40; G06T 3/40; G06T 3/0037; G06T 19/006; G06T 2207/10012;
(Continued)

(56) References Cited

U.S. PATENT DOCUMENTS 10,694,184 B2   6/2020  Ahn et al.
2010/0238160 A1* 9/2010 Yea .................. G06T 3/0093
                                                345/419
(Continued)

FOREIGN PATENT DOCUMENTS

CN   104702963 A   6/2015
CN   105141948 A  12/2015
(Continued)

OTHER PUBLICATIONS

Non-Final Office Action dated Oct. 6, 2020, issued in U.S. Appl. No. 16/737,377.
(Continued)

*Primary Examiner* — Jose L Couso
(74) *Attorney, Agent, or Firm* — McClure, Qualey & Rodack, LLP

(57) ABSTRACT

Methods and apparatus of coding a video sequence, wherein pictures from the video sequence contain one or more discontinuous edges are disclosed. The loop filtering process associated with the loop filter is then applied to the current reconstructed pixel to generate a filtered reconstructed pixel, where if the loop filtering process is across a virtual boundary of the current picture, one or more alternative reference pixels are used to replace unexpected reference pixels located in a different side of the virtual boundary from the current reconstructed pixel, and said one or more alternative reference pixels are generated from second reconstructed pixels in a same side of the virtual boundary as the current reconstructed pixel. According to another method, reference pixels are derived from spherical neighbouring reference pixels for the loop filtering process.

16 Claims, 10 Drawing Sheets

Related U.S. Application Data filed on Jan. 14, 2019, provisional application No. 62/725,307, filed on Aug. 31, 2018.

(51) Int. Cl.

| | | |
|---|---|---|
| *G06T 3/40* | (2006.01) | |
| *G06T 19/00* | (2011.01) | |
| *H04N 19/186* | (2014.01) | |
| *H04N 19/105* | (2014.01) | |
| *H04N 19/172* | (2014.01) | |
| *H04N 19/117* | (2014.01) | |

(52) U.S. Cl.
CPC ......... *H04N 19/105* (2014.11); *H04N 19/117* (2014.11); *H04N 19/172* (2014.11); *H04N 19/186* (2014.11)

(58) Field of Classification Search
CPC . G06T 2207/10016; G06T 2207/10021; G06T 13/00; G06T 17/00; G06T 17/10; H04N 19/186; H04N 19/105; H04N 19/172; H04N 19/117; H04N 19/167; H04N 19/174; H04N 19/597; H04N 19/119; H04N 19/176; H04N 19/52; H04N 19/61; H04N 19/56; H04N 19/563; H04N 19/577; H04N 19/593; H04N 19/85; H04N 19/82; H04N 19/96; H04N 19/157; H04N 19/13; H04N 5/23238; H04N 5/341; H04N 13/00; H04N 13/111; H04N 13/117; H04N 13/122; H04N 13/161
See application file for complete search history.

(56) References Cited

U.S. PATENT DOCUMENTS

| | | | | |
|---|---|---|---|---|
| 2013/0044809 | A1* | 2/2013 | Chong | H04N 19/182 375/240.03 |
| 2013/0272624 | A1* | 10/2013 | Budagavi | H04N 19/192 382/239 |
| 2013/0322523 | A1 | 12/2013 | Huang et al. | |
| 2013/0343447 | A1 | 12/2013 | Chen et al. | |
| 2017/0214937 | A1 | 7/2017 | Lin et al. | |
| 2017/0332107 | A1 | 11/2017 | Abbas et al. | |
| 2019/0007684 | A1* | 1/2019 | Van Der Auwera | H04N 19/176 |
| 2019/0089961 | A1* | 3/2019 | Ahn | H04N 19/159 |
| 2019/0215532 | A1* | 7/2019 | He | G06T 17/30 |
| 2019/0253734 | A1* | 8/2019 | Lee | H04N 5/23238 |
| 2020/0120359 | A1* | 4/2020 | Hanhart | H04N 19/105 |
| 2020/0304787 | A1* | 9/2020 | Budagavi | H04N 19/167 |
| 2020/0396461 | A1* | 12/2020 | Zhao | H04N 19/117 |

FOREIGN PATENT DOCUMENTS

| | | | |
|---|---|---|---|
| CN | 107040778 A | 8/2017 | |
| CN | 107155109 A | 9/2017 | |
| CN | 104702963 B | 11/2017 | |
| CN | 109155857 A | 1/2019 | |
| WO | 2018/036447 A1 | 3/2018 | |
| WO | WO-2018182377 A1 * | 10/2018 | ........... H04N 9/3147 |

OTHER PUBLICATIONS

Chinese language office action dated Aug. 27, 2020, issued in application No. TW 108131376.

European Search Report dated Jun. 1, 2021, issued in application No. EP 19854497.5.

Chen, C.Y., et al.; "CE8.c.3: Multi-source SAO and ALF virtual boundary processing;" Joint Collaborative Team on Video Coding (JCT-VC) of ITU-T SG16 WP3 and ISO/IEC JTC1/SC29/WG11; Nov. 2011; pp. 1-11.

Lin, S.Y., et al.; "CE-13 related: Loop filter disabled across virtual boundaries;" Joint Video Experts Team (JVET) of ITU-T SG 16 WP 3 and ISO/IEC JTC 1/SC 29/WG 11; Jan. 2019; pp. 1-17.

Chinese language office action dated Feb. 9, 2021, issued in application No. TW 108148059.

* cited by examiner

METHOD AND APPARATUS OF IN-LOOP FILTERING FOR VIRTUAL BOUNDARIES IN VIDEO CODING

CROSS REFERENCE TO RELATED APPLICATIONS

The present invention claims priority to U.S. Provisional Patent Application, Ser. No. 62/725,307, filed on Aug. 31, 2018, U.S. Provisional Patent Application, Ser. No. 62/791, 963, filed on Jan. 14, 2019 and U.S. Provisional Patent Application, Ser. No. 62/792,489, filed on Jan. 15, 2019. The U.S. Provisional Patent Applications are hereby incorporated by reference in their entireties.

FIELD OF THE INVENTION

The present invention relates to picture processing for pictures containing one or more virtual boundaries, such as 360-degree virtual reality (VR360) pictures. In particular, the present invention relates to in-loop filtering process at discontinuous edges or virtual boundaries for pictures containing one or more virtual boundaries, such as VR360 video coding.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

The 360-degree virtual reality (VR) pictures may be captured using a 360-degree spherical panoramic camera or multiple pictures arranged to cover all field of views around 360 degrees. The three-dimensional (3D) spherical picture is difficult to process or store using the conventional picture/video processing devices. Therefore, the 360-degree VR pictures are often converted to a two-dimensional (2D) format using a 3D-to-2D projection method, such as EquiRectangular Projection (ERP) and CubeMap Projection (CMP). Besides the ERP and CMP projection formats, there are various other VR projection formats, such as OctaHedron Projection (OHP), icosahedron projection (ISP), Segmented Sphere Projection (SSP) and Rotated Sphere Projection (RSP) that are widely used in the field.

The VR360 video sequence usually requires more storage space than the conventional 2D video sequence. Therefore, video compression is often applied to VR360 video sequence to reduce the storage space for storage or the bit rate for streaming/transmission.

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). VR360 video sequences can be coded using HEVC. However, the present invention may also be applicable for other coding methods.

In HEVC, one slice is partitioned into multiple coding tree units (CTU). For colour pictures, a colour slice may be a partitioned into multiple coding tree blocks (CTB). The CTU is further partitioned into multiple coding units (CUs) to adapt to various local characteristics. HEVC supports multiple Intra prediction modes and for Intra coded CU, the selected Intra prediction mode is signalled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

While the coding process can effectively reduce required bandwidth for transmission or required capacity for storage, the coding process often introduces coding noise referred as coding artefacts. In order to alleviate the coding artefact, various filtering techniques, such as de-blocking filter, SAO (sample adaptive offset) and ALF (adaptive loop filter), have been introduced. The filtering process is often applied to reconstructed pictures that are later used as reference pictures. In other words, the filtering process is inside the coding loop. Accordingly, such filtering process is also referred as in-loop filtering.

In HEVC, de-blocking filter is applied after the picture is reconstructed. The boundaries between coding units, prediction units or transform units are filtered to alleviate the blocking artefacts caused by the block-based coding. The boundary can be a vertical or horizontal boundary. The boundary pixels involved in de-blocking filtering process for the vertical boundary (110) and horizontal boundary (120) as shown in FIG. 1A and FIG. 1B respectively. For a vertical boundary (i.e., line 110 in FIG. 1A), a horizontal filter is applied to some boundary samples in each horizontal line. For example, the horizontal de-blocking filter may be applied to p00, p01 and p02 on the left side of the vertical boundary and q00, q01 and q02 on the right side of the vertical boundary. Similarly, for a horizontal boundary (i.e., line 120 in FIG. 1B), a vertical filter is applied to some boundary samples in each vertical line. For example, the vertical de-blocking filter may be applied to p00, p01 and p02 on the top side of the horizontal boundary and q00, q01 and q02 on the bottom side of the horizontal boundary. In other words, the de-blocking filter is applied in a direction perpendicular to the boundary.

A boundary strength value, Bs is calculated for each four-sample length boundary and can take 3 possible values. Luma and chroma components are processed separately in the de-blocking process. For the Luma component, only block boundaries with Bs values equal to 1 or 2 can be filtered. In the case of chroma components, only boundaries with Bs value equal to 2 can be filtered.

For luma component, additional conditions are checked for each four-sample length boundary to determine whether de-blocking filtering should be applied and to further determine whether a normal filter or a strong filter should be applied if de-blocking is applied.

For the luma component in the normal filtering mode, two samples at each side of the boundary can be modified. In the strong filtering mode, three samples at each side of the boundary can be modified.

For the chroma component, only one sample at each side of the boundary can be modified when the boundary strength is greater than 1.

SAO processing is developed to compensate intensity level offset caused by the coding process. SAO processing adopted by HEVC consists of two methods. One is Band Offset (BO), and the other is Edge Offset (EO). BO is used to classify pixels into multiple bands according to pixel intensities and an offset is applied to pixels in one or more bands. EO is used to classify pixels into categories according to relations between a current pixel and respective neighbours and an offset is applied to pixels in each category. There are 4 EO directional patterns (0°, 90°, 135°, and 45°) and no processing (OFF). The four EO types are shown in FIG. 2.

Upon classification of all pixels in a region, one offset is derived and transmitted for pixels in each category. SAO processing is applied to luma and chroma components, and each of the components is independently processed. One offset is derived for all pixels of each category except for category 4 of EO, where Category 4 is forced to use zero offset. Table 1 below lists the EO pixel classification, where "C" denotes the pixel to be classified. As shown in Table 1, the conditions associated with determining a category are related to comparing the current pixel value with two respective neighbour values according to the EO type. The category can be determined according to the comparison results (i.e., ">", "<" or "="). Each category has a special meaning in relative intensity between the current pixel and neighbouring pixels. For example, category 0 corresponds to a "valley", where the intensity of the centre pixel is lower than two neighbouring pixels. Category 3 corresponds to a "peak", where the intensity of the centre pixel is higher than two neighbouring pixels. Categories 1 and 2 correspond to a flat segment with an upward slope (Category 2) or a downward slope (Category 1).

TABLE 1

| Category | Condition |
| --- | --- |
| 0 | C < two neighbours |
| 1 | C < one neighbour && C == one neighbour |
| 2 | C > one neighbour && C == one neighbour |
| 3 | C > two neighbours |
| 4 | None of the above |

Adaptive Loop Filter (ALF) is a filter with adaptive filter size applied to the reconstructed pixels. ALF was evaluated during the HEVC standard development, but not adopted for HEVC. However, ALF is being considered by the emerging video coding standard, named VVC (Versatile Video Coding). To optimize the performance, ALF uses Wiener filtering techniques to derive filter coefficients. Furthermore, multiple filters are allowed for different picture regions. For example, the ALF can be a 5×5 filter or a 7×7 filter as shown in FIG. 3, where "C" indicates a current reconstructed pixel being filtered.

According to a conventional approach, the loop filters such as de-blocking, SAO and ALF will be applied to a reconstructed VR360 picture without considering the possible discontinued edges within the VR360 picture. For example, the cubemap based projection uses six faces on a cube to represent one frame in the VR360 video. The six faces corresponds to faces lifted off from the cube and fitted into different layouts, such as 1×6, 6×1, 2×3 or 3×2 layout. Among various cubemap layouts, the 3×2 layout is often used due to its coding efficiency. FIG. 4 illustrates an example of 3×2 cubemap layout formation. The layout 410 corresponds to six faces lifted off from a cube, where image 412 corresponds to a front face, the three images 414 connected to the left of image 412 correspond to the other three faces connected to the front face 412 in the horizontal direction, image 416 corresponds to the face on the top of the cube and image 418 corresponds to the face on the bottom of the cube. Accordingly, the fours images including images 414 and image 412 are continuous in the horizontal direction and the three images includes image 416, image 412 and image 418 are continuous in the vertical direction. The 4×3 layout 410 contains some blank areas, which is not efficient for coding. The layout 420 corresponds to a 3×2 cubemap layout, where the three images 414 and the three vertically connected images (images 416, 412 and 418) are abutted. The top sub-frame corresponding to the three images 414 are continuous in the horizontal direction. Also, the bottom sub-frame corresponding to the three images 412, 416 and 418 are continuous in the horizontal direction. However, the edges 422 between the top sub-frame and the bottom sub-frame is discontinuous. In other words, a VR360 picture corresponding to a layout format from a 3D projection may contain discontinuous edge within the picture.

Besides the VR360 pictures, other picture formats may also contain discontinuous edges within the picture. For example, the Picture-In-Picture (PIP) format is a popular format to display two videos (e.g. a main video and a sub-video) on the same screen simultaneously. Therefore, for each PIP frame, discontinuity may exist between the pictures associated with the two videos. The issues of loop filtering process across the discontinuous edge exist in the VR360 pictures as well as the PIP frames.

FIG. 5A to FIG. 5C illustrate examples of in-loop filters applied to a reconstructed VR360 picture. FIG. 5A illustrates an example of de-blocking filter, where the de-blocking filter is applied to a current block 510. The de-blocking filter is applied to the horizontal boundary 516 between the current block 510 and the neighbouring block 512 above. The de-blocking filter is also applied to the vertical boundary 518 between the current block 510 and the neighbouring block 514 on the left.

FIG. 5B illustrates an example of SAO processing. The offset compensation parameters are derived based on the statistics of each coding tree unit (CTU) 520. During the statistic derivation, the BO and EO classification is applied to all pixels. For each BO and EO category, an offset value is determined. After the statistics for the CTU are collected, the SAO can be applied to reconstructed pixels in the CTU.

FIG. 5C illustrates an example of ALF process for a reconstructed VR360 picture. A reconstructed pixel 530 may be filtered by a 5×5 filter or a reconstructed pixel 532 may be filtered by a 7×7 filter. As mentioned before, the filter parameters may be designed using Wiener filter technique to minimize the error between the original picture and the reconstructed picture. For each reconstructed pixel, the filter size is adaptively selected to achieve the best performance.

As illustrated in layout 420 in FIG. 4, the 3×2 layout for cubemap contains a discontinuous edge between the top sub-frame and the bottom sub-frame. The pixels on one side of the boundary 422 may be quite different from the pixels on the other side of the boundary 422. Therefore, when an in-loop filter is applied to reconstructed pixels next to the boundary or close to the boundary, it may cause undesirable result. FIG. 6 illustrates an example of SAO filter applied to a reconstructed pixel 622, where the discontinuous edge 610 is indicated. SAO operation 620 at the discontinuous edge is illustrated for the reconstructed pixel 622. The 3×3 SAO window is indicated by the dash-lined box 624. For the horizontal boundary 610, the SAO filtering process for 90°, 135°, and 45° will utilise a reference pixel from the other side of the discontinuous boundary. The neighbouring pixels 626 on the other side of discontinuous edge (named unexpected pixels) may be very different from the reconstructed pixel 622 being filtered though they are close to the reconstructed pixel 622. In this case, the SAO processing for the boundary pixels may produce undesirable results.

Therefore, it is desirable to develop techniques to overcome the issues related to in-loop filter for VR360 pictures.

BRIEF SUMMARY OF THE INVENTION

Methods and apparatus of coding a video sequence, wherein pictures from the video sequence include one or more discontinuous edges are disclosed. According to this method, a reconstructed filtered unit in a current picture is received, wherein the reconstructed filtered unit is associated with a loop filter and the reconstructed filtered unit comprises first reconstructed pixels for applying a loop filtering process associated with the loop filter to a current reconstructed pixel. The loop filtering process associated with the loop filter is then applied to the current reconstructed pixel to generate a filtered reconstructed pixel, where if the loop filtering process is across a virtual boundary of the current picture, one or more alternative reference pixels are used to replace unexpected reference pixels located in a different side of the virtual boundary from the current reconstructed pixel, and said one or more alternative reference pixels are generated from second reconstructed pixels in a same side of the virtual boundary as the current reconstructed pixel. A processed current picture comprising the filtered reconstructed pixel is provided. The video sequence may correspond to a 360-degree virtual reality (VR360) video. The loop filter belongs to a group comprising de-blocking filter, SAO (Sample Adaptive Offset) and ALF (Adaptive Loop Filter).

In one embodiment, the alternative reference pixels are generated by extending nearest second reconstructed pixels in the same side of the virtual boundary as the current reconstructed pixel. In another embodiment, the alternative reference pixels are generated by clipping positions of unexpected reference located pixels in the different side of the virtual boundary to modified positions in the same side of the virtual boundary as the current reconstructed pixel and closest to the unexpected reference pixels.

In one embodiment, the alternative reference pixels are generated on-the-fly when the loop filtering process associated with the loop filter is applied to the current reconstructed pixel.

In another embodiment, the alternative reference pixels are generated before the loop filtering process associated with the loop filter is applied to the current reconstructed pixel. The alternative reference pixels generated can be stored in one or more extra line buffers. The size of said one or more extra line buffers for each side of the virtual boundary corresponds to a largest integer equal to or less than half of a maximum filter size. For example, the size of said one or more extra line buffers for each side of the virtual boundary is equal to 4 for a luma component of the current picture when the loop filter corresponds to de-blocking filter. In another example, the size of said one or more extra line buffers for each side of the virtual boundary is equal to 1 when the loop filter corresponds to SAO (Sample Adaptive Offset) filter. In yet another example, the size of said one or more extra line buffers for each side of the virtual boundary is less than or equal to 5 for classification of a luma component of the current picture when the loop filter corresponds to ALF (Adaptive Loop Filter).

According to another method of the present invention, the loop filtering process associated with the loop filter is applied to the current reconstructed pixel to generate a filtered reconstructed pixel, where if the loop filtering process is across a virtual boundary of the VR360 picture, one or more spherical neighbouring reference pixels are used to replace unexpected reference pixels located in a different side of the virtual boundary from the current reconstructed pixel, and wherein said one or more spherical neighbouring reference pixels correspond to geometrically continuous neighbouring reference pixels in a 3D space adjacent to a part of the reconstructed filtered unit containing the current reconstructed pixel, and said one or more spherical neighbouring reference pixels and the part of the reconstructed filtered unit containing the current reconstructed pixel are in different faces of the VR360 picture.

A control flag can be signalled to indicate whether the loop filtering process is allowed to be applied across a slice, tile or CTU (Coding Tree Unit) boundary. If the control flag indicates that the loop filtering process is disabled across the slice, tile or CTU boundary, the loop filtering process is applied to the current reconstructed pixel when the current reconstructed pixel and said one or more spherical neighbouring reference pixels are in a same slice, tile or CTU boundary.

DETAILED DESCRIPTION OF THE INVENTION

Figure 1A:
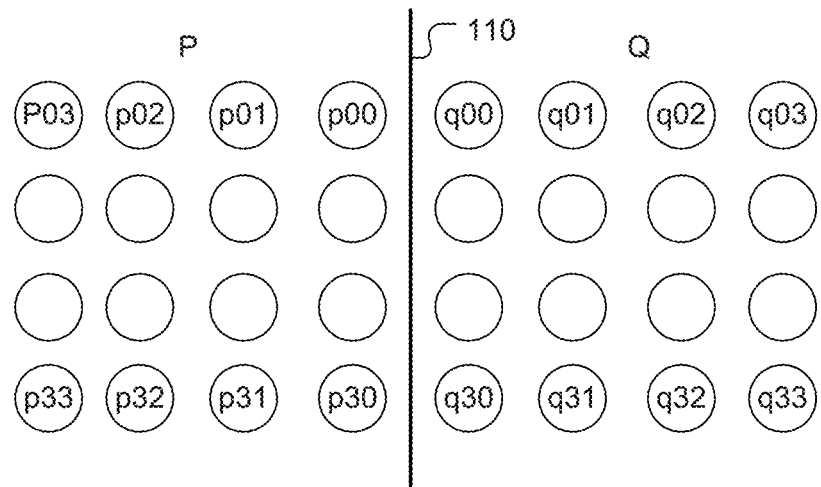
FIG. 1A illustrates an example of the boundary pixels involved in de-blocking filtering process for the vertical boundary.

The following description is of the best-contemplated mode of carrying out the invention. This description is made for the purpose of illustrating the general principles of the invention and should not be taken in a limiting sense. The scope of the invention is best determined by reference to the appended claims.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In the description like reference numbers appearing in the drawings and description designate corresponding or like elements among the different views.

As mentioned before, when an in-loop filter is applied to a discontinuous boundary in VR360 videos, the filtering process for reconstructed pixels on one side of the discontinuous boundary may need to use one or more reconstructed pixels on the other side of the discontinuous boundary (referred as unexpected pixels). Due to the discontinuity between the pixels on two sides of the discontinuous boundary, use of the unexpected pixels for the in-loop filtering processing may cause noticeable artefacts. Therefore, according to a method of the present invention, the in-loop filtering process is modified if the in-loop filtering process is across the discontinuous boundary. The discontinuous boundary or edge in VR360 video or PIP is also referred as virtual boundary in this disclosure. The in-loop filter may be referred as loop filter in this disclosure. The in-loop filtering process may be referred as loop filtering process in this disclosure.

When performing the filtering process, if the referenced pixels and current pixels are located in different sub-frames (i.e., different side of discontinuous edge/virtual boundaries), the nearest pixels in the current sub-frame (i.e., the same side of the discontinuous edge/virtual boundaries as the current pixel) are taken as the alternative referenced pixels according to embodiments of the present invention.

The alternative referenced pixels can be derived on-the-fly or derived in advance. If the pixels are derived in advance, extra memory buffers will be needed to store the pixels.

This method is applicable to the de-blocking filter, ALF and SAO filters as well as other types of in-loop filter.

Figure 7:
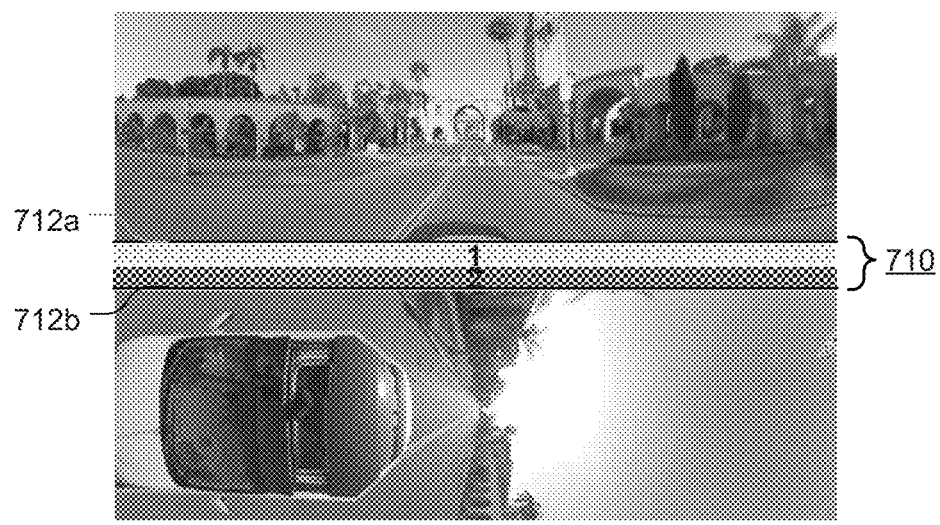
FIG. 7 illustrates an example of reference pixels extension 710 for loop filtering process across a discontinuous edge or virtual boundary according to embodiments of the present invention.

FIG. 7 illustrates an example of reference pixels extension 710 for loop filtering process across a discontinuous edge or virtual boundary according to embodiments of the present invention. In FIG. 7, pixels from the top sub-frame are extended to form alternative reference pixels (labelled as dot-filled area 1) and pixels from the bottom sub-frame are extended to form alternative reference pixels (labelled as dot-filled area 2). In FIG. 7, the virtual boundary (712a and 712b) are shown for the top sub-frame and the bottom sub-frame. When the pixels on the same side of the virtual boundary are extended to form the alternative reference pixels, the nearest pixels in the current sub-frame are used. In other words, the bottom line of the top sub-frame is extended downward to form the reference pixel area 1 and the top line of the bottom sub-frame is extended upward to form the reference pixel area 2. When a reference pixel from the other side of the discontinuous edge or virtual boundary is required for the loop filtering process, the nearest pixels in the current sub-frame (i.e., on the same side of discontinuous edge/virtual boundary as the current pixel) are used as the alternative referenced pixels. In FIG. 7, the VR360 picture consists of a top sub-frame and a bottom sub-frame. As is understood, the 3×2 cubemap layout is intended as an example to illustrate the reference pixel extension according to embodiment of the present invention. The reference pixel extension can be applied to other VR360 layout formats, such as the layout formats derived from OctaHedron Projection (OHP), icosahedron projection (ISP), Segmented Sphere Projection (SSP) and Rotated Sphere Projection (RSP). There may be more than one virtual boundaries in the VR360 pictures. Furthermore, the virtual boundaries may be in other directions instead of vertical/horizontal. When the loop filtering process involves unexpected reference pixels (i.e., reference pixels on the other side of the virtual boundary), the reference pixels on the same side as the current reconstructed pixel to be filtered can be extended to form the alternative reference pixels.

As mentioned before, the discontinuous edge (i.e., virtual boundary) within a picture may also occur for non-VR360 pictures. For example, in Picture-In-Picture video, the pictures also include discontinuous edges within the picture. The loop filtering process of the present invention can also be applied to the PIP video.

In another embodiment, when perform the filtering process, if the referenced pixels (i.e., unexpected reference pixels) and the current pixel are located at the different sides of the virtual boundary, the reference pixel positions can be clipped to the positions located at the same side of the virtual boundary as the current pixel and closest to the referenced pixels (i.e., unexpected reference pixels). This approach is similar to extending the pixels from the virtual boundary.

In one embodiment, if the pixels are derived in advance, floor(max_filter_size_of_all_filters/2)*2 extra line buffers can be used to store the alternative referenced pixels. The floor(•) represents the floor function that returns a largest integer less than or equal to its input variable. The extra buffers are padded by the nearest pixels in the corresponding sub-frame (i.e., on the same side of discontinuous edge/virtual boundaries as the current reconstructed pixel). When performing filtering process, the alternative reference pixels in the extra buffers will be used.

Figure 8:
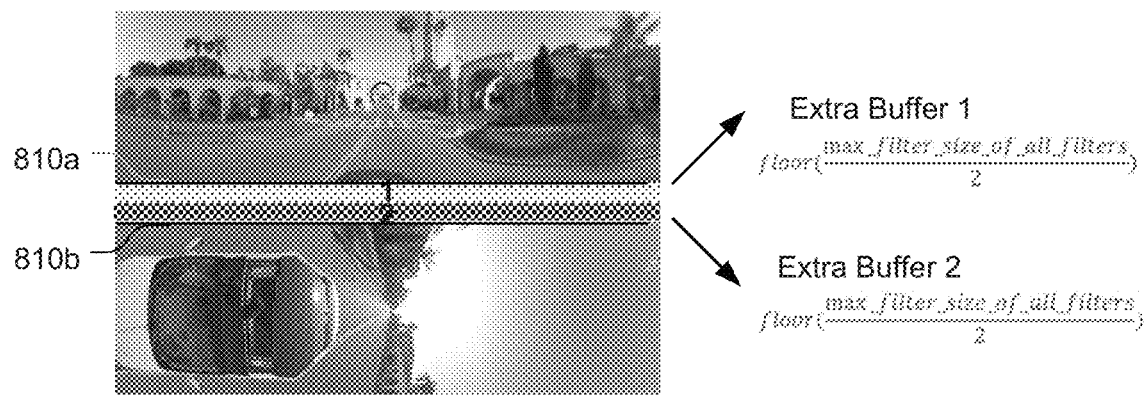
FIG. 8 illustrates an example of allocating one or more extra line buffers to store reference pixels on both sides of a discontinuous edge or virtual boundary (810a and 810b) according to embodiments of the present invention.

FIG. 8 illustrates an example of allocating one or more extra line buffers to store reference pixels on both sides of a discontinuous edge or virtual boundary (810a and 810b) according to embodiments of the present invention. As shown in FIG. 8, a number of extra line buffers (i.e., floor(max_filter_size_of_all_filters/2)) is used to store reference pixels in area 1 and a number of extra line buffers (i.e., floor(max_filter_size_of_all_filters/2)) is used to store reference pixels in area 2. When the loop filtering process is applied to a reconstructed pixel in the top sub-frame that needs reference pixels from the other side of the discontinuous edge or virtual boundary (i.e., bottom sub-frame), the pixels stored in the extra buffer 1 are used as the alternative reference pixels. Similarly, when the loop filtering process is applied to a reconstructed pixel in the bottom sub-frame that needs reference pixels from the other side of the discontinuous edge or virtual boundary (i.e., top sub-frame), the pixels stored in the extra buffer 2 are used as the alternative reference pixels.

Figure 1B:
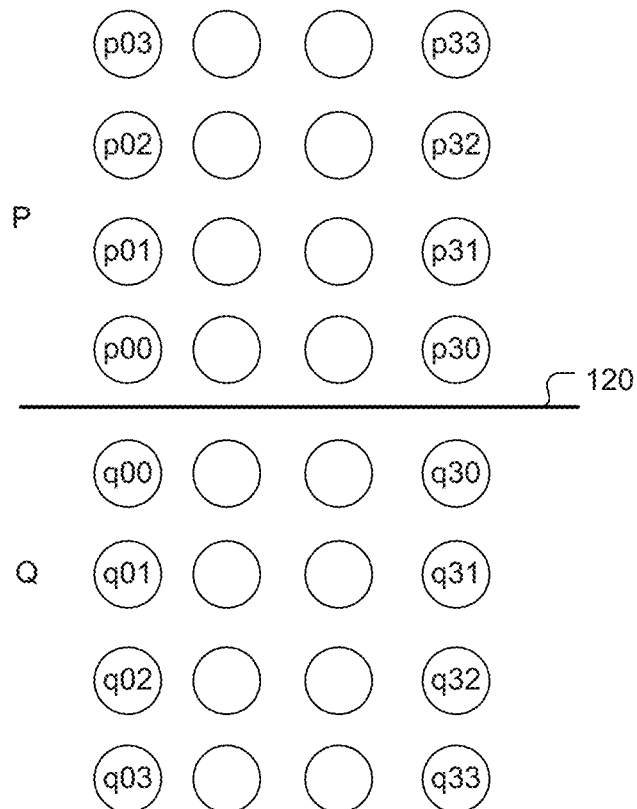
FIG. 1B illustrates an example of the boundary pixels involved in de-blocking filtering process for the horizontal boundary.
Figure 2:
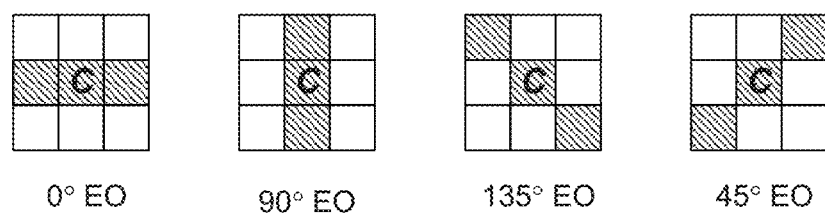
FIG. 2 shows the 4 EO (Edge Offset) directional patterns (0°, 90°, 135°, and 45°) for SAO (Sample Adaptive Offset).
Figure 3:
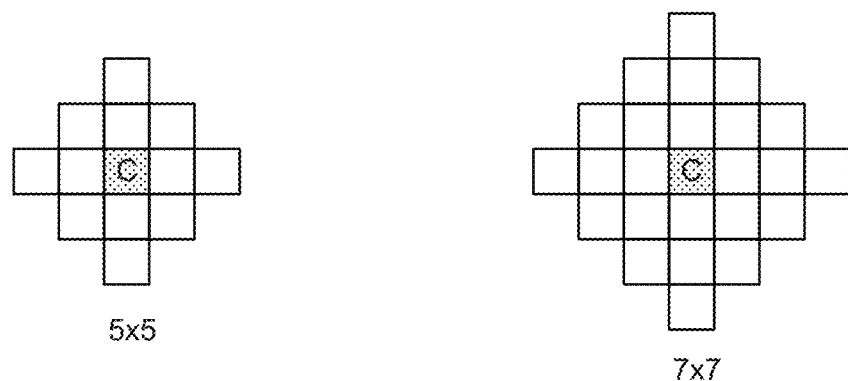
FIG. 3 illustrates an example of the ALF comprising a 5×5 filter and a 7×7 filter, where "C" indicates a current reconstructed pixel being filtered.
Figure 4:
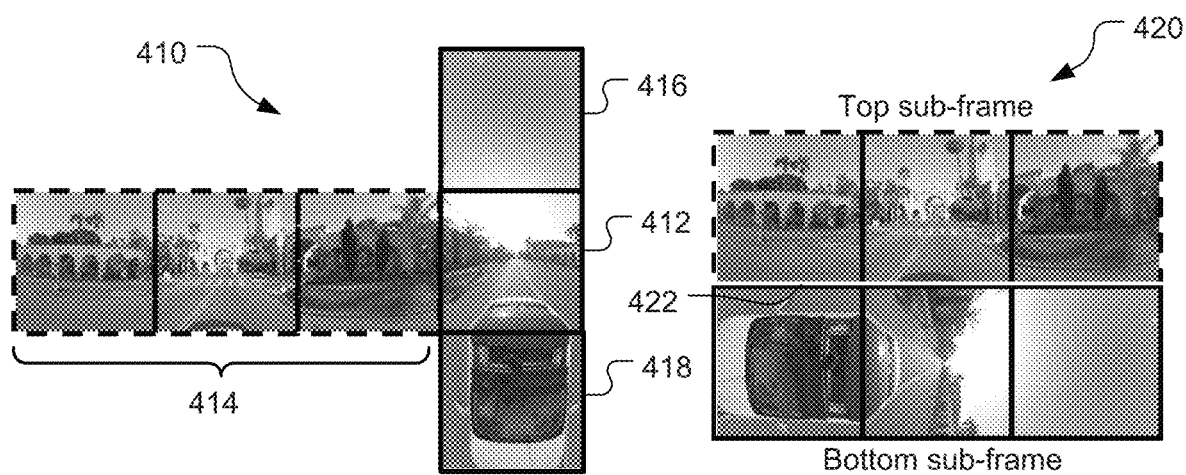
FIG. 4 illustrates an example of 4×3 and 3×2 cubemap layout formations.
Figure 5A:
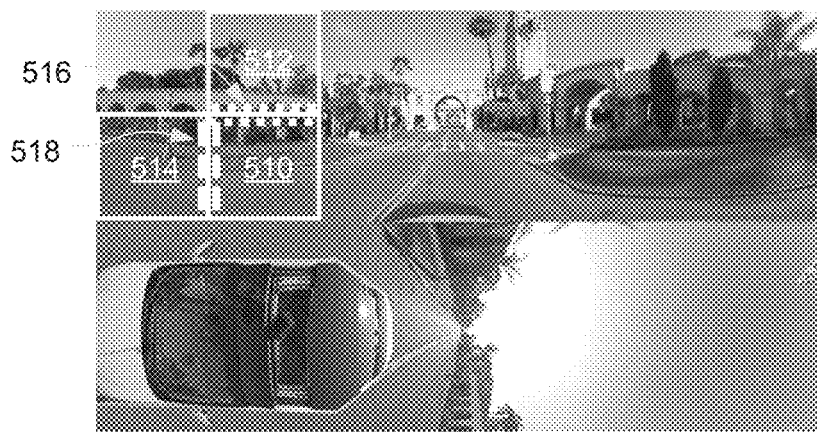
FIG. 5A illustrates an example of de-blocking filter applied to a block of a VR360 picture in the 3×2 layout.
Figure 5B:
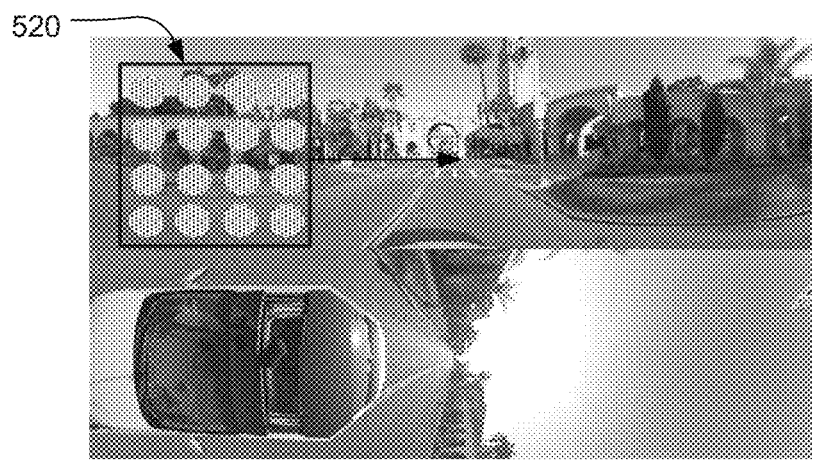
FIG. 5B illustrates an example of SAO processing applied to pixels of a VR360 picture in the 3×2 layout.
Figure 5C:
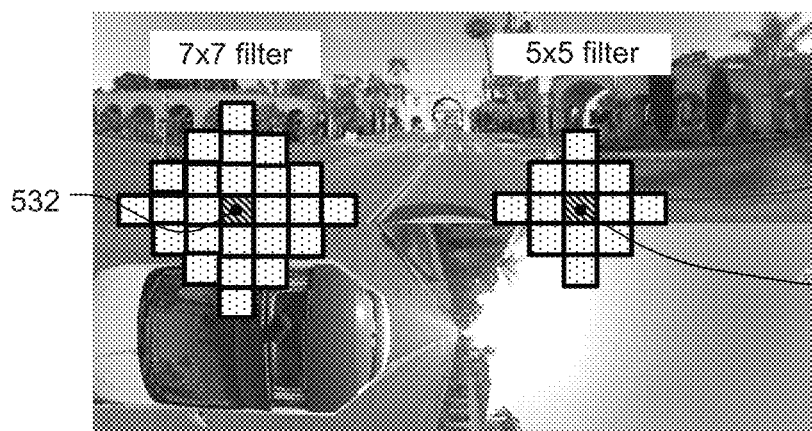
FIG. 5C illustrates an example of ALF process using a 5×5 or 7×7 filter for a reconstructed VR360 picture.
Figure 6:
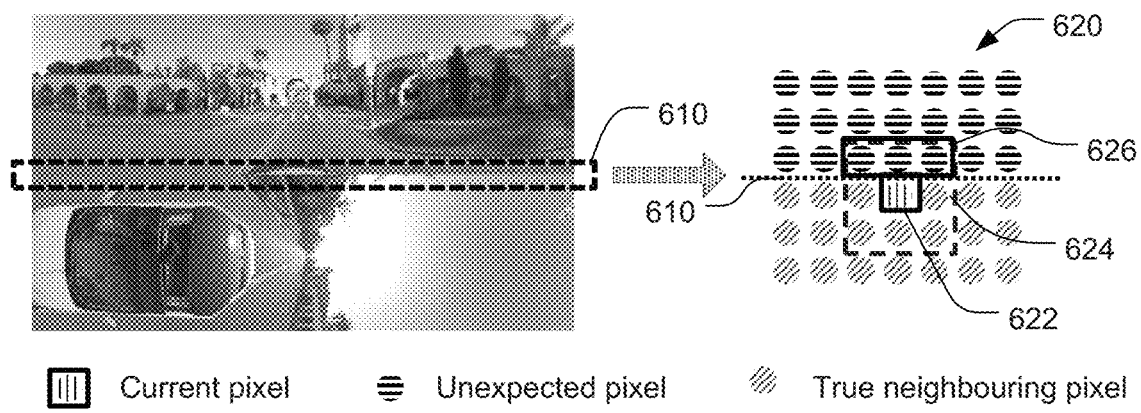
FIG. 6 illustrates an example of SAO filter applied to a reconstructed pixel at the discontinuous edge.
Figure 9:
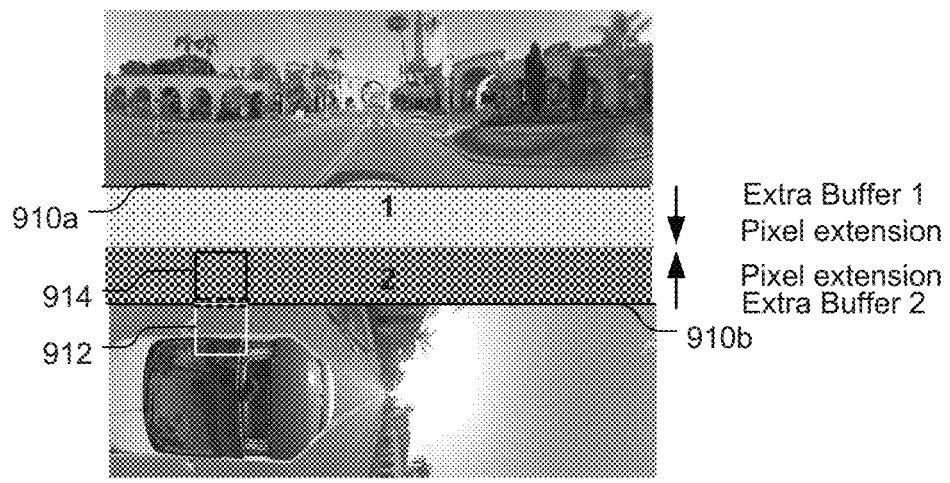
FIG. 9 illustrates an example of extra line buffers for the de-blocking filtering process according to an embodiment of the present invention.

FIG. 9 illustrates an example of extra line buffers for the de-blocking filtering process according to an embodiment of the present invention. The discontinuous edge or virtual boundary (910a and 910b) are shown. The current block 912 being filtered has its block edge aligned with the discontinuous edge or virtual boundary 910b. All the reference pixels on the other side of the block edge required for the de-blocking filtering process are on the other side of the discontinuous edge or virtual boundary 910b. Therefore, according to an embodiment of the present invention, the alternative reference pixels 914 stored in the extra line buffer 2 are used for the de-blocking filtering process. The de-blocking filter for the luma component according to the HEVC standard utilizes up to 4 pixels away from the block boundary as shown in FIG. 1. Therefore, the extra line buffers for the de-blocking process can be 4 lines on each side of the virtual boundary for the luma component.

Figure 10:
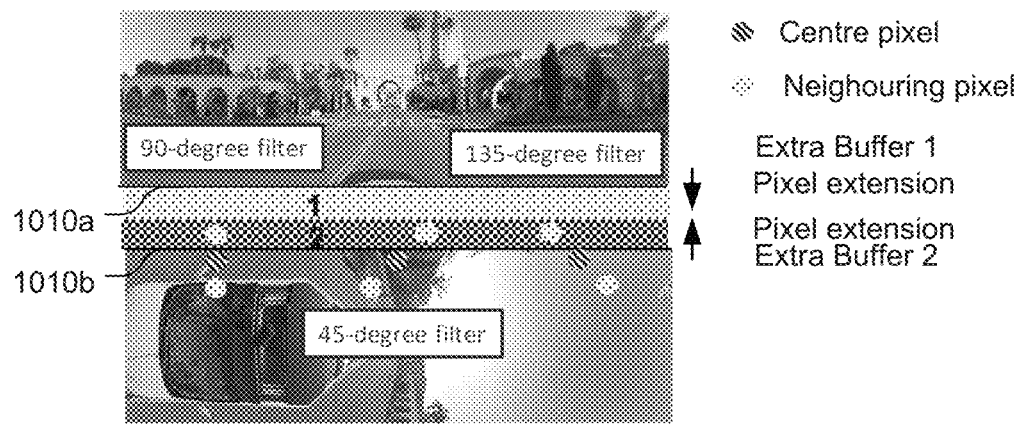
FIG. 10 illustrates an example of extra line buffers for the SAO filtering process according to an embodiment of the present invention.

FIG. 10 illustrates an example of extra line buffers for the SAO filtering process according to an embodiment of the present invention. The discontinuous edge or virtual boundary (1010a and 1010b) are shown. The centre pixel for the SAO filtering process is located adjacent to the discontinuous edge or virtual boundary 1010b. The neighbouring pixel on the top for the 90° filter is on the other side of discontinuous edge or virtual boundary 1010b. According to an embodiment of the present invention, an alternative reference pixel stored in the extra line buffer 2 is used for the SAO filtering process. For the 45°, SAO filter, the upper right reference pixel is on the other side of discontinuous edge or virtual boundary 1010b. According to an embodiment of the present invention, an alternative reference pixel stored in the extra line buffer 2 is used for the SAO filtering process. For the 135°, SAO filter, the upper left reference pixel is on the other side of discontinuous edge or virtual boundary 1010b. According to an embodiment of the present invention, an alternative reference pixel stored in the extra line buffer 2 is used for the SAO filtering process. Therefore, the extra line buffers for SAO process can be 1 line on each side of the virtual boundary for the luma component.

Figure 11:
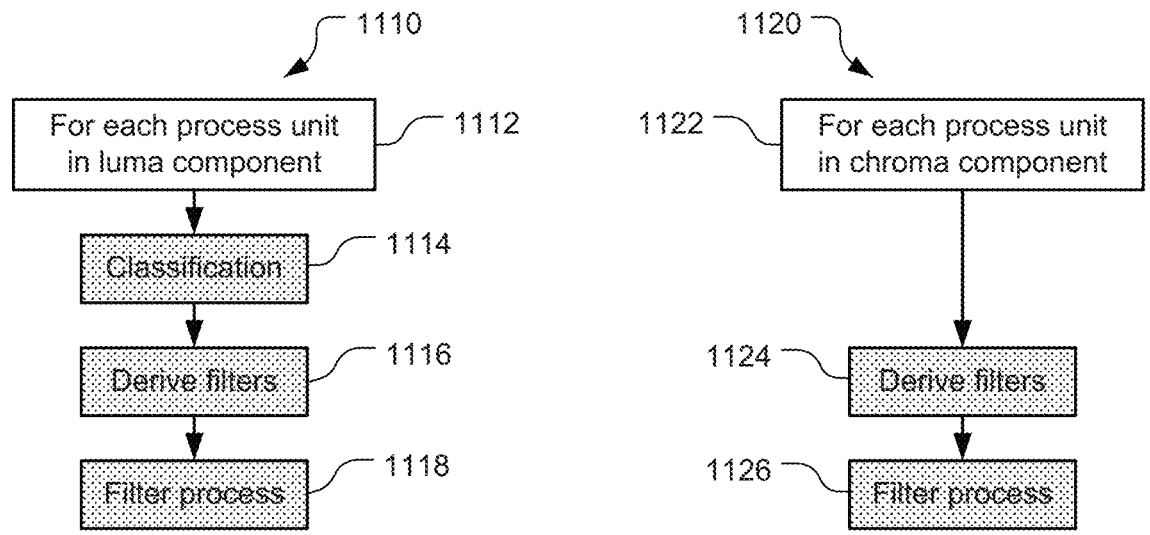
FIG. 11 illustrates exemplary processing flow for the luma ALF processing and chroma ALF processing.

For the ALF filtering process, the processing flow is shown in FIG. 11 for the luma ALF processing 1110 and chroma ALF processing 1120. For the luma ALF processing, each processing unit is inputted to the process as shown in step 1112. The processing unit may correspond to a picture, a slice, a CTU row or a CTU. Classification is performed in step 1114. The filters are derived in step 1116 and the filter process is applied in step 1118. For the chroma ALF processing, each processing unit is inputted to the process as shown in step 1122. The filters are derived in step 1124 and the filter process is applied in step 1126.

Figure 12:
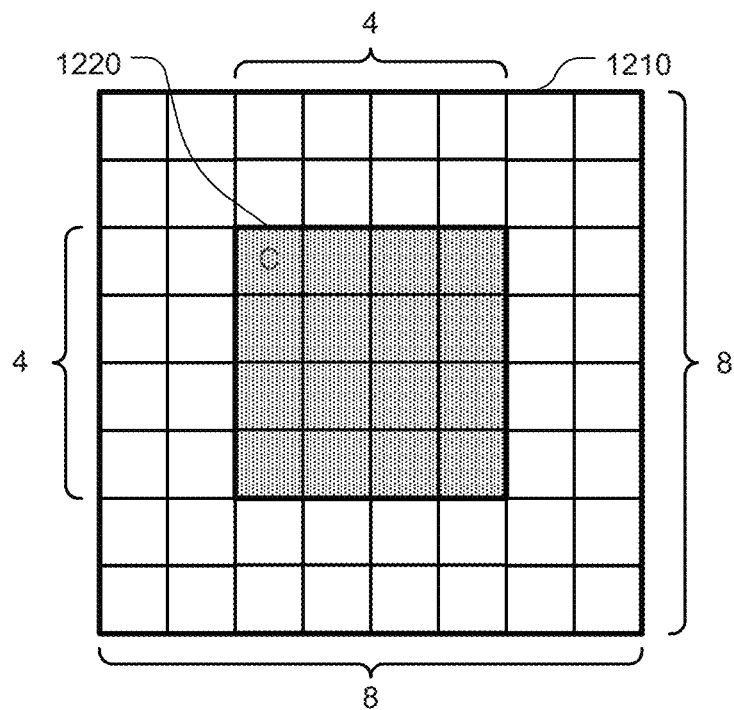
FIG. 12 illustrates an example of the classification process, where the classification method is first performed for each CTB in luma component, and pixels are classified into 16 groups according to pixel texture characteristics and pixel locations.

FIG. 12 illustrates an example of the classification process. For each CTB in luma component, the classification method is first performed, and pixels are classified into 16 groups according to pixel texture characteristics and pixel locations. Pixels in 4×4 block 1220 share the same classification result. 1-D Laplacian values for both horizontal and vertical are calculated within an 8×8 window 1210. The 1-D Laplacian values within the 8×8 block for horizontal and vertical direction are summed respectively.

For each classification group, one filter can be derived by solving the Wiener-Hopf equation. Therefore, 16 filters can be derived in one classification method (i.e., one filter one group).

Wiener-Hopf equation:

$$\begin{bmatrix} \sum_{\|R\|} t[r+p_0]t[r+p_0] & \sum_{\|R\|} t[r+p_1]t[r+p_0] & \cdots & \sum_{\|R\|} t[r+p_{24}]t[r+p_0] \\ \sum_{\|R\|} t[r+p_0]t[r+p_1] & \sum_{\|R\|} t[r+p_1]t[r+p_1] & \cdots & \sum_{\|R\|} t[r+p_{24}]t[r+p_1] \\ \vdots & \vdots & \ddots & \vdots \\ \sum_{\|R\|} t[r+p_0]t[r+p_{20}] & \sum_{\|R\|} t[r+p_1]t[r+p_{20}] & \cdots & \sum_{\|R\|} t[r+p_{24}]t[r+p_{24}] \end{bmatrix}$$

$$\begin{bmatrix} c_0 \\ c_1 \\ \vdots \\ c_{24} \end{bmatrix} = \begin{bmatrix} \sum_{\|R\|} s[r]t[r+p_0] \\ \sum_{\|R\|} s[r]t[r+p_1] \\ \vdots \\ \sum_{\|R\|} s[r]t[r+p_{24}] \end{bmatrix}$$

In the above equation, the variables or parameters are described as follows:
1. Pixel location r=(x, y) belongs to classification R, and ||R|| is the number of pixels in R.
2. s[r]: original pixel.
3. t[r]: reconstruction pixel in the picture buffer.

4. Filter coefficients: $c=[c_0\ c_1\ \ldots\ c_{24}]^T$.
5. Filter tap position offset: $\{p\ p_1\ \ldots\ p_{24}\}$, where $p_n$ denotes the pixel location offset to r of the nth filter tap.

Figure 13A:
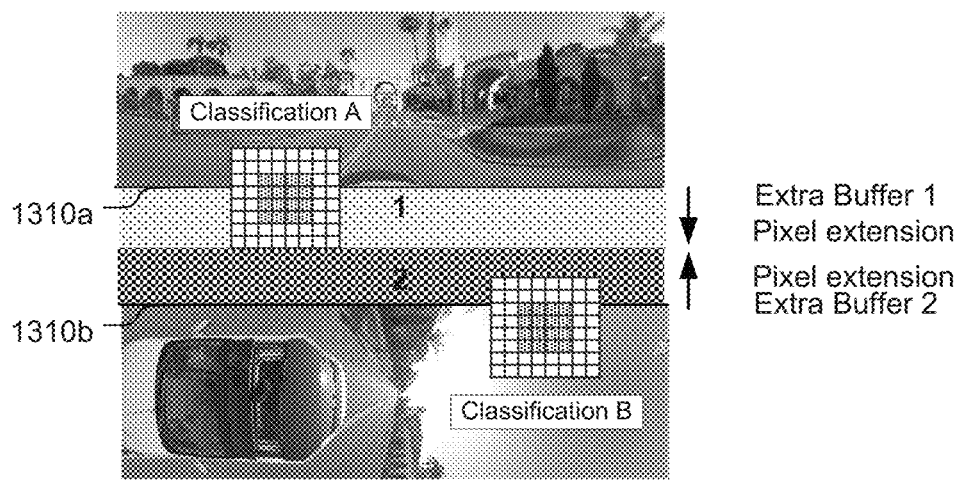
FIG. 13A illustrates examples of classification of the ALF filtering process at and near the virtual boundary.

FIG. 13A illustrates examples of classification of the ALF filtering process at and near the virtual boundary. The discontinuous edge or virtual boundary (1310a and 1310b) are shown. For classification A, the lower 5 rows of the 8×8 block are outside the discontinuous edge or virtual boundary 1310a. According to an embodiment of the present invention, the reference pixels in the extra line buffer 1 are used as alternative reference pixel for the classification process. For classification B, the upper 2 rows of the 8×8 block are outside the discontinuous edge or virtual boundary 1310b. According to an embodiment of the present invention, the reference pixels in the extra line buffer 2 are used as alternative reference pixel for the classification process. The number of extra line buffers as required for ALF classification is less than or equal to 5 lines in each side of the virtual boundary.

Figure 13B:
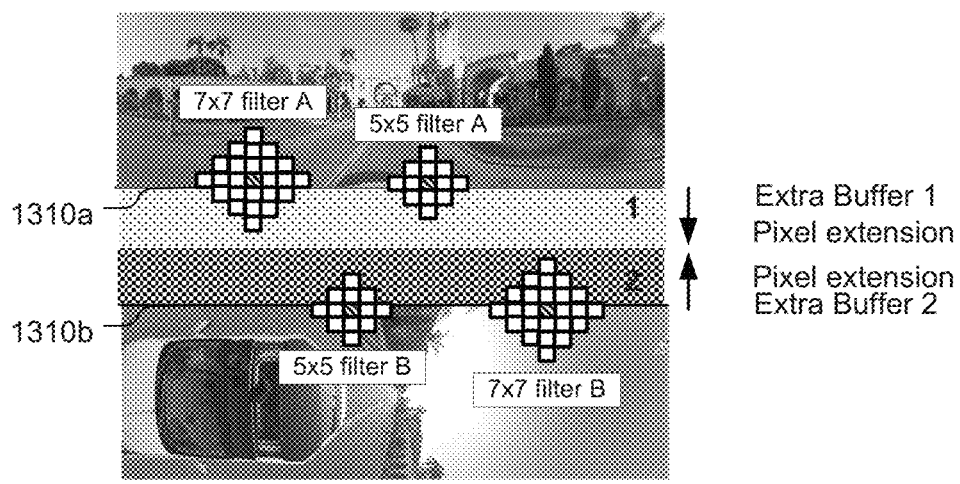
FIG. 13B illustrates an examples of the ALF filtering process at the virtual boundary for 7×7 and 5×5 ALFs.

FIG. 13B illustrates examples of the ALF filtering process at the virtual boundary for 7×7 and 5×5 ALFs. The discontinuous edge or virtual boundary (1310a and 1310b) are shown. For 7×7 filter A and 5×5 filter A, the centre pixel is adjacent to the discontinuous edge or virtual boundary 1310a. According to an embodiment of the present invention, the reference pixels in the extra line buffer 1 are used as alternative reference pixel for the ALF filtering process. For 7×7 filter B and 5×5 filter B, the centre pixel is adjacent to the discontinuous edge or virtual boundary 1310b. According to an embodiment of the present invention, the reference pixels in the extra line buffer 2 are used as alternative reference pixel for the ALF filtering process.

While the examples in FIG. 13B illustrate the case that the centre pixel is adjacent to the virtual boundary, the required reference pixels may across the virtual boundary when the centre pixel is close to the virtual boundary. For example, if the 7×7 filter is selected and the centre pixel is 1 pixel away from the virtual boundary, 3 reference pixels adjacent to the virtual boundary and 1 reference pixel at 1 pixel distance from the virtual boundary from the other side of the virtual boundary will be involved in the ALF processing. If the 7×7 filter is selected and the centre pixel is 2 pixel away from the virtual boundary, 1 reference pixel adjacent to the virtual boundary from the other side of the virtual boundary will be involved in the ALF processing. If the 7×7 filter is selected and the centre pixel is 3 pixel away from the virtual boundary, no reference pixel from the other side of the virtual boundary will be involved in the ALF processing.

Figure 14:
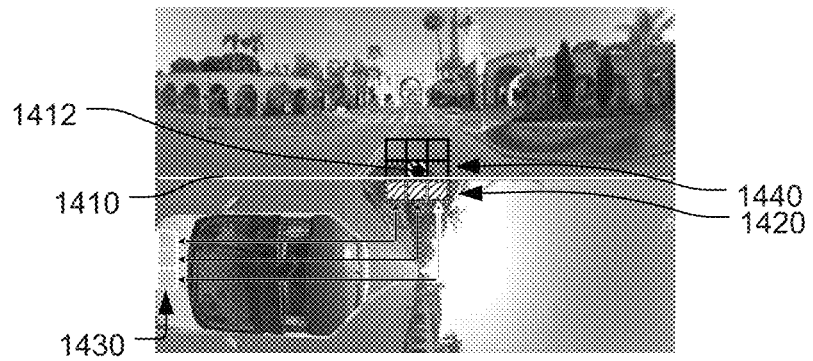
FIG. 14 illustrates an example of reference pixels from spherical neighbours for the SAO process.

According to another method, reference pixels from spherical neighbours are used. Based on the geometry continuity of VR360 pictures, the spherical neighbours, which can be derived in the same picture, are used for the filtering process. The corresponding neighbours can be derived in the corresponding face in 3D vision. An example of reference pixels from spherical neighbours is shown in FIG. 14 for the SAO process. For the centre pixel 1412 adjacent to the virtual boundary 1410, the SAO involves 1 pixel in pixel row 1420 below the current pixel for 90°, 135° or 45° SAO processing. While the neighbouring pixels 1420 are discontinuous across the virtual boundary, the pixels adjacent to the centre row 1440 of the SAO filter come from the pixels 1430 on the left edge of the bottom sub-frame. This continuity can be perceived by mapping the individual faces to a cube for the cubemap projection. In other words, for 90°, 135° or 45° SAO processing, one part of filtered unit (i.e., one pixel in the top row of the 3×3 window) is in the same side of the virtual boundary as the current reconstructed pixel being filtered and the other part of the filtered unit (i.e., one pixel in the bottom row of the 3×3 window) is on the other side of the virtual boundary from the current reconstructed pixel being filtered. Nevertheless, the spherical neighbouring reference pixels (i.e., pixels 1430) are geometrically continuous neighbouring reference pixels in a 3D space adjacent to the part of the reconstructed filtered unit containing the current reconstructed pixel. Besides the cubemap, there are many other VR360 projection layouts. The spherical connectivity among faces lifted off a polyhedron can be identified by mapping the projection layout back to the surface of a corresponding polyhedron.

In some cases, the filtering process can be limited not to process across the slice, tile or CTU boundaries in a reconstructed picture. For example, for the de-blocking filter, a control flag "m_bLFCrossSliceBoundaryFlag" can be used to control whether the filtering process can be performed across slice boundaries. If the control is set to True, the filtering process can be performed across slice boundaries. If the control is set to False, the filtering process cannot be performed across slice boundaries. Therefore, it should check if the neighbouring block and the current block are located in the same slice. If they are located in the same slice, the filtering process can be performed, otherwise, the filtering process is disabled.

Figure 15A:
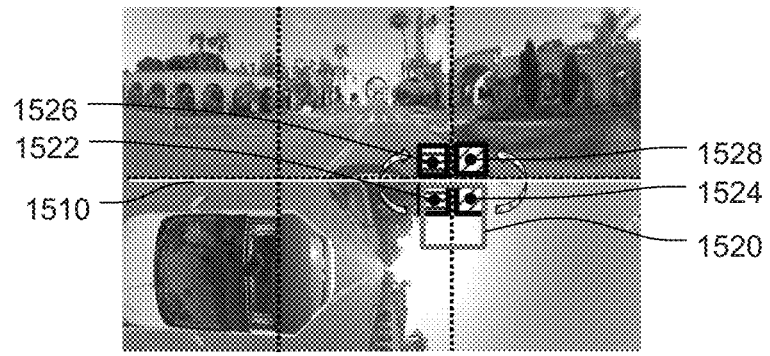
FIG. 15A illustrates an example of conventional checking process for a VR360 picture in the 3×2 cubemap layout.

FIG. 15A illustrates an example of conventional checking process for a VR360 picture in the 3×2 cubemap layout. The virtual boundary 1510 between the top sub-frame and the bottom sub-frame is indicated by a white line. The face edges are indicated by black dash lines. A CU 1520 being filtered has its top CU edge aligned with the virtual boundary. Furthermore, the CU is also located between two faces with the face edge going through the middle of the CU in vertical direction. The de-blocking process for the top CU edge is divided into two sub-blocks (i.e., 1522 and 1524) since the spherical neighbouring sub-blocks for the two sub-blocks are from different locations of the 3×2 cubemap layout. According to the conventional method, two blocks (i.e., 1526 and 1528) from other faces are involved for the de-blocking process. Furthermore, blocks 1526 and 1528 belong to different slice. Accordingly, the control flag is set to disable the loop filtering process (i.e., de-blocking process in this example).

Figure 15B:
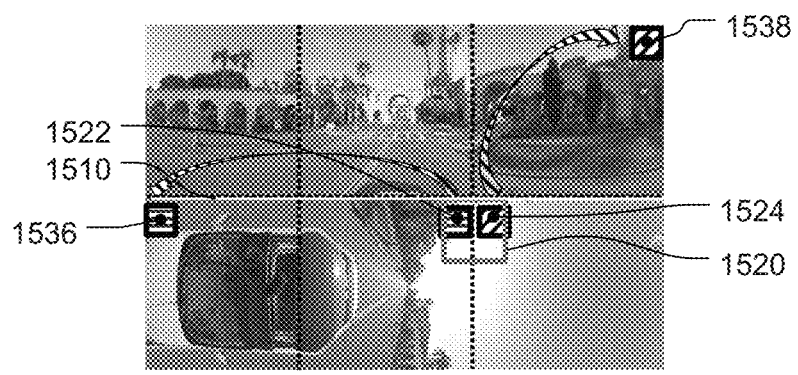
FIG. 15B illustrates an example of the checking process according to an embodiment of the present invention by taking into account of the spherical neighbours.

In the conventional implementation of the de-blocking filter, the checking operation (i.e., checking whether the current block and neighbouring block are located in the same slice) can only be performed at the upper-left block of a CU because all the neighbouring blocks of the other blocks in the CU are located in the same slice. However, in VR360 pictures, a CU could be located in multiple faces and the neighbouring blocks could be located in different slices by taking into account of the spherical neighbours. FIG. 15B illustrates an example of the checking process by taking into account of the spherical neighbours. The spherical neighbour for block 1536 is located at upper-left corner of the bottom sub-frame, which is in the same slice as the current block. Therefore, the loop filtering process can be applied to block 1522 since its spherical neighbour is in the same slice. In this case, even if the control flag is set to disable the loop filtering process across the slice boundary, the loop filtering process still can be applied to block 1522 since the loop filtering process does not cross the slice boundary. However, for block 1524, its spherical neighbour is located at the upper right corner of the top sub-frame. Therefore, the loop filtering process is not applied to block 1524 if the control flag is set to disable the loop filtering process across the slice boundary.

The checking operations should be performed for each block to make sure the coding correctness. Therefore, if a filtering process such as ALF, SAO, or other filters is limited by a control flag, the checking operation should be performed at each filter unit to make sure the coding correctness.

This method is applicable to the de-blocking filter, ALF and SAO filter as well as other types of loop filters.

Figure 16:
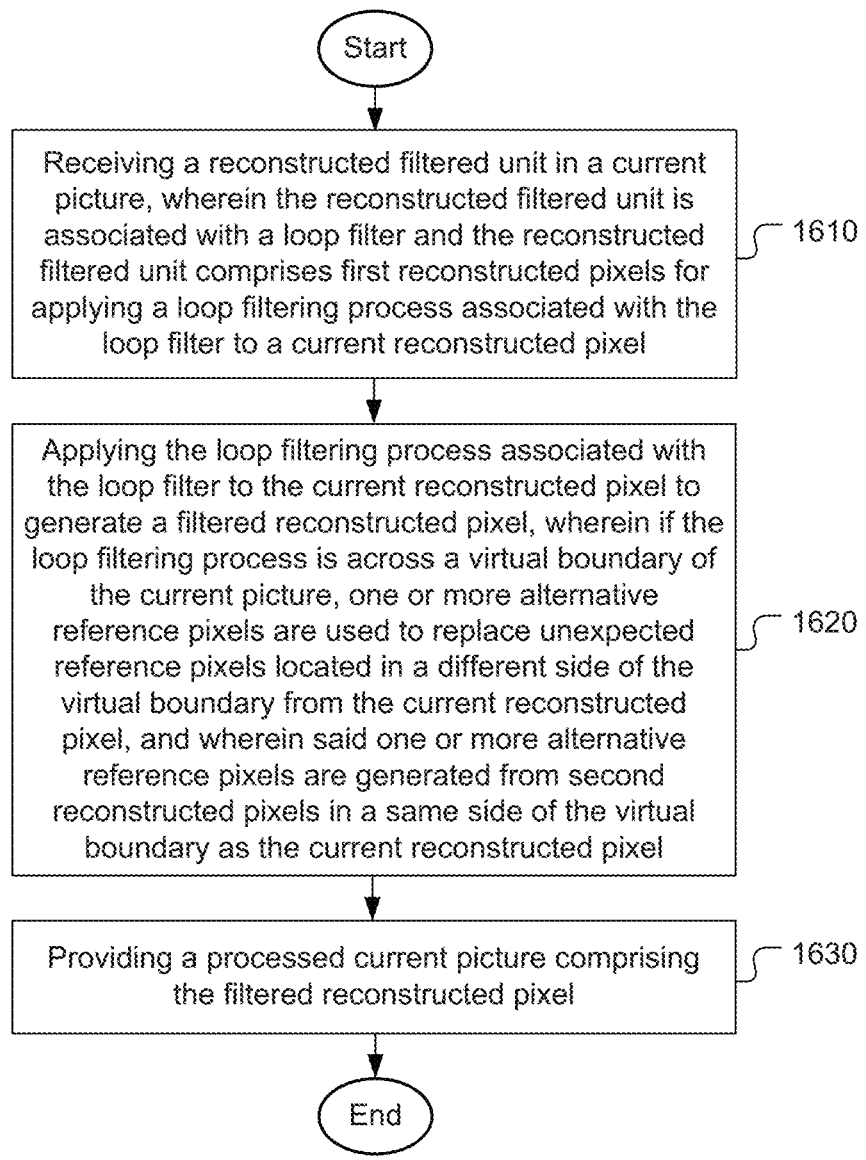
FIG. 16 illustrates an exemplary flowchart of a coding system for VR360 video according to an embodiment of the present invention, where the loop filtering process is applied across a virtual boundary by using alternative reference pixels.

FIG. 16 illustrates an exemplary flowchart of a coding system for a video sequence including one or more discontinuous edges in pictures of the video sequence according to an embodiment of the present invention, where the loop filtering process is applied across a virtual boundary by using alternative reference pixels. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a reconstructed filtered unit in a current picture is received in step 1610, wherein the reconstructed filtered unit is associated with a loop filter and the reconstructed filtered unit comprises first reconstructed pixels for applying a loop filtering process associated with the loop filter to a current reconstructed pixel. The loop filtering process associated with the loop filter is applied to the current reconstructed pixel to generate a filtered reconstructed pixel in step 1620, wherein if the loop filtering process is across a virtual boundary of the current picture, one or more alternative reference pixels are used to replace unexpected reference pixels located in a different side of the virtual boundary from the current reconstructed pixel, and wherein said one or more alternative reference pixels are generated from second reconstructed pixels in a same side of the virtual boundary as the current reconstructed pixel. A processed current picture comprising the filtered reconstructed pixel is provided in step 1630.

Figure 17:
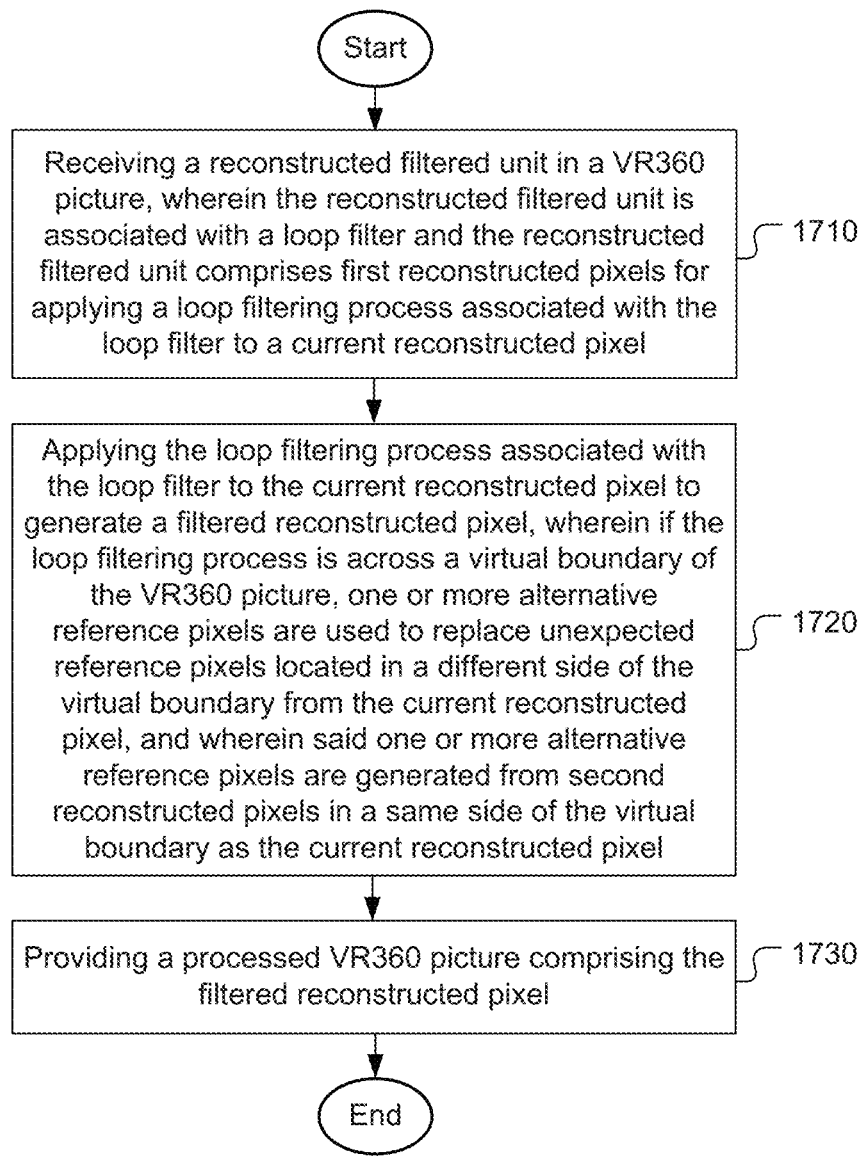
FIG. 17 illustrates an exemplary flowchart of a coding system for VR360 video according to an embodiment of the present invention, where the loop filtering process is applied across a virtual boundary by using spherical neighbouring reference pixels.

FIG. 17 illustrates an exemplary flowchart of a coding system for VR360 video according to an embodiment of the present invention, where the loop filtering process is applied across a virtual boundary by using spherical neighbouring reference pixels. According to this method, a reconstructed filtered unit in a VR360 picture is received in step 1710, wherein the reconstructed filtered unit is associated with a loop filter and the reconstructed filtered unit comprises first reconstructed pixels for applying a loop filtering process associated with the loop filter to a current reconstructed pixel. The loop filtering process associated with the loop filter is applied to the current reconstructed pixel to generate a filtered reconstructed pixel in step 1720, wherein if the loop filtering process is across a virtual boundary of the VR360 picture, one or more spherical neighbouring reference pixels are used to replace unexpected reference pixels located in a different side of the virtual boundary from the current reconstructed pixel, and wherein said one or more spherical neighbouring reference pixels correspond to geometrically continuous neighbouring reference pixels in a 3D space with a part of the reconstructed filtered unit containing the current reconstructed pixel, and said one or more spherical neighbouring reference pixels and the part of the reconstructed filtered unit containing the current reconstructed pixel are in different faces of the VR360 picture. A processed VR360 picture comprising the filtered reconstructed pixel is provided in step 1730.

The flowcharts shown above are intended for serving as examples to illustrate embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a video sequence, wherein pictures from the video sequence include one or more discontinuous edges, the method comprising:

receiving a reconstructed filtered unit in a current picture, wherein the reconstructed filtered unit is associated with a loop filter and the reconstructed filtered unit comprises first reconstructed pixels for applying a loop filtering process associated with the loop filter to a current reconstructed pixel;

applying the loop filtering process associated with the loop filter to the current reconstructed pixel to generate a filtered reconstructed pixel, wherein if the loop filtering process is across a virtual boundary of the current picture, one or more alternative reference pixels are used to replace unexpected reference pixels located in a different side of the virtual boundary from the current reconstructed pixel, and wherein said one or more alternative reference pixels are generated from second reconstructed pixels in a same side of the virtual boundary as the current reconstructed pixel; and providing a processed current picture comprising the filtered reconstructed pixel.

2. The method of claim 1, wherein the video sequence corresponds to a 360-degree virtual reality (VR360) video.

3. The method of claim 1, wherein the loop filter belongs to a group comprising de-blocking filter, SAO (Sample Adaptive Offset) filter and ALF (Adaptive Loop Filter).

4. The method of claim 1, wherein the alternative reference pixels are generated by extending nearest second reconstructed pixels in the same side of the virtual boundary as the current reconstructed pixel.

5. The method of claim 1, wherein the alternative reference pixels are generated by clipping positions of unexpected reference located pixels in the different side of the virtual boundary to modified positions in the same side of the virtual boundary as the reconstructed filtered unit and closest to the unexpected reference pixels.

6. The method of claim 1, wherein the alternative reference pixels are generated on-the-fly when the loop filtering process associated with the loop filter is applied to the current reconstructed pixel.

7. The method of claim 1, wherein the alternative reference pixels are generated before the loop filtering process associated with the loop filter is applied to the current reconstructed pixel.

8. The method of claim 7, wherein the alternative reference pixels generated are stored in one or more extra line buffers.

9. The method of claim 8, wherein a size of said one or more extra line buffers for each side of the virtual boundary corresponds to a largest integer equal to or less than half of a maximum filter size.

10. The method of claim 9, wherein the size of said one or more extra line buffers for each side of the virtual boundary is equal to 4 for a luma component of the current picture when the loop filter corresponds to de-blocking filter.

11. The method of claim 9, wherein the size of said one or more extra line buffers for each side of the virtual boundary is equal to 1 when the loop filter corresponds to SAO (Sample Adaptive Offset) filter.

12. The method of claim 9, wherein the size of said one or more extra line buffers for each side of the virtual boundary is less than or equal to 5 for classification and filtering of a luma component of the current picture when the loop filter corresponds to ALF (Adaptive Loop Filter).

13. An apparatus for coding a video sequence, wherein pictures from the video sequence include one or more discontinuous edges, the apparatus comprising one or more electronic devices or processors configured to:
receive a reconstructed filtered unit in a current picture, wherein the reconstructed filtered unit is associated with a loop filter and the reconstructed filtered unit comprises first reconstructed pixels for applying a loop filtering process associated with the loop filter to a current reconstructed pixel;
apply the loop filtering process associated with the loop filter to the current reconstructed pixel to generate a filtered reconstructed pixel, wherein if the loop filtering process is across a virtual boundary of the current picture, alternative reference pixels are used to replace unexpected reference pixels located in a different side of the virtual boundary from the current reconstructed pixel, and wherein the alternative reference pixels are generated from second reconstructed pixels in a same side of the virtual boundary as the current reconstructed pixel; and
provide a processed current picture comprising the filtered reconstructed pixel.

14. A method of coding 360-degree virtual reality (VR360) video, the method comprising:
receiving a reconstructed filtered unit in a VR360 picture, wherein the reconstructed filtered unit is associated with a loop filter and the reconstructed filtered unit comprises first reconstructed pixels for applying a loop filtering process associated with the loop filter to a current reconstructed pixel;
applying the loop filtering process associated with the loop filter to the current reconstructed pixel to generate a filtered reconstructed pixel, wherein if the loop filtering process is across a virtual boundary of the VR360 picture, one or more spherical neighbouring reference pixels are used to replace unexpected reference pixels located in a different side of the virtual boundary from the current reconstructed pixel, and wherein said one or more spherical neighbouring reference pixels correspond to geometrically continuous neighbouring reference pixels in a 3D space adjacent to a part of the reconstructed filtered unit containing the current reconstructed pixel, and said one or more spherical neighbouring reference pixels and the part of the reconstructed filtered unit containing the current reconstructed pixel are in different faces of the VR360 picture; and
providing a processed VR360 picture comprising the filtered reconstructed pixel.

15. The method of claim 14, wherein the loop filter belongs to a group comprising de-blocking filter, SAO (Sample Adaptive Offset) and ALF (Adaptive Loop Filter).

16. An apparatus for coding 360-degree virtual reality (VR360) video, the apparatus comprising one or more electronic devices or processors configured to:
receive a reconstructed filtered unit in a VR360 picture, wherein the reconstructed filtered unit is associated with a loop filter and the reconstructed filtered unit comprises first reconstructed pixels for applying a loop filtering process associated with the loop filter to a current reconstructed pixel;
apply the loop filtering process associated with the loop filter to the current reconstructed pixel to generate a filtered reconstructed pixel, wherein if the loop filtering process is across a virtual boundary of the VR360 picture, one or more spherical neighbouring reference pixels are used to replace unexpected reference pixels located in a different side of the virtual boundary from the current reconstructed pixel, and wherein said one or more spherical neighbouring reference pixels correspond to geometrically continuous neighbouring reference pixels in a 3D space adjacent to a part of the reconstructed filtered unit containing the current reconstructed pixel, and said one or more spherical neighbouring reference pixels and the part of the reconstructed filtered unit containing the current reconstructed pixel are in different faces of the VR360 picture; and
provide a processed VR360 picture comprising the filtered reconstructed pixel.

* * * * *